(12) United States Patent
Masuko

(10) Patent No.: US 9,690,783 B2
(45) Date of Patent: Jun. 27, 2017

(54) IMAGE CONVERSION AND METHOD FOR CONVERTING TEXT IN AN IMAGE INTO A TARGETED LANGUAGE

(71) Applicant: Rakuten, Inc., Tokyo (JP)

(72) Inventor: Soh Masuko, Tokyo (JP)

(73) Assignee: RAKUTEN, INC., Tokyo (JP)

(\*) Notice: Subject to any disclaimer, the term of this patent is extended or adjusted under 35 U.S.C. 154(b) by 13 days.

(21) Appl. No.: 14/781,033

(22) PCT Filed: Mar. 29, 2013

(86) PCT No.: PCT/JP2013/059748
§ 371 (c)(1),
(2) Date: Sep. 29, 2015

(87) PCT Pub. No.: WO2014/155734
PCT Pub. Date: Oct. 2, 2014

(65) Prior Publication Data
US 2016/0140112 A1     May 19, 2016

(51) Int. Cl.
*G06F 17/21*     (2006.01)
*G06F 17/28*     (2006.01)
(Continued)

(52) U.S. Cl.
CPC .......... *G06F 17/289* (2013.01); *G06F 17/212* (2013.01); *G06F 17/243* (2013.01);
(Continued)

(58) Field of Classification Search
CPC ............... G06F 17/21; G06F 17/2247
(Continued)

(56) References Cited

U.S. PATENT DOCUMENTS 7,774,504 B2\*  8/2010  Chene ................... G06F 17/243
                                                                      705/26.8
8,818,130 B2\*  8/2014  Morgan-Mar ....... G06K 9/3216
                                                                      348/187
(Continued)

FOREIGN PATENT DOCUMENTS

JP    2000-067048    3/2000
JP    2007-074140    3/2007
(Continued)

OTHER PUBLICATIONS

English Translation of International Search Report for PCT/JP2013/059748 dated Apr. 23, 2013.
(Continued)

*Primary Examiner* — Michael N Opsasnick
(74) *Attorney, Agent, or Firm* — Hubbs, Enatsky & Inoue PLLC

(57) ABSTRACT

To reduce a processing load of a server in a system for displaying an image in which a text indicated by converted text data is superimposed on an image prepared in advance. Text-including image data including text data and image data for displaying a text-including image in which a text indicated by the text data is superimposed on an image indicated by the image data is obtained. Converted text data resulting from conversion of the text data included in the text-including image data is obtained. The text data included in the image data is replaced by the converted text data. A text-including image in which a text indicated by the replaced text data is superimposed on the image indicated by the image data is displayed in a client, based on the text-including image data including the replaced text data and the image data.

9 Claims, 16 Drawing Sheets

(51) Int. Cl.
*G06F 17/24* (2006.01)
*G09G 5/14* (2006.01)
*G09G 5/36* (2006.01)
*G09G 5/397* (2006.01)

(52) U.S. Cl.
CPC .............. *G09G 5/14* (2013.01); *G09G 5/363* (2013.01); *G09G 5/397* (2013.01); *G09G 2370/022* (2013.01); *G09G 2370/16* (2013.01)

(58) Field of Classification Search
USPC ........................................................ 715/201
See application file for complete search history.

(56) References Cited

U.S. PATENT DOCUMENTS

| | | | | |
|---|---|---|---|---|
| 2002/0052849 | A1* | 5/2002 | McCutchen | G06F 21/10 |
| | | | | 705/59 |
| 2004/0260535 | A1* | 12/2004 | Chen | G06F 9/543 |
| | | | | 704/9 |
| 2005/0071755 | A1* | 3/2005 | Harrington | G06F 17/2288 |
| | | | | 715/229 |
| 2005/0240756 | A1* | 10/2005 | Mayer | G06F 9/4418 |
| | | | | 713/2 |
| 2006/0161646 | A1* | 7/2006 | Chene | G06F 17/243 |
| | | | | 709/223 |
| 2007/0128899 | A1* | 6/2007 | Mayer | G06F 9/4406 |
| | | | | 439/152 |
| 2008/0300859 | A1* | 12/2008 | Chen | G06F 9/543 |
| | | | | 704/7 |
| 2009/0161945 | A1* | 6/2009 | Morgan-Mar | G06K 9/3216 |
| | | | | 382/154 |
| 2013/0132825 | A1* | 5/2013 | Masuko | G06F 17/211 |
| | | | | 715/236 |
| 2014/0056525 | A1 | 2/2014 | Masuko | |
| 2014/0310585 | A1 | 10/2014 | Masuko | |
| 2015/0025909 | A1* | 1/2015 | Hayter, II | G06F 19/321 |
| | | | | 705/3 |

FOREIGN PATENT DOCUMENTS

| | | |
|---|---|---|
| JP | 2010-157066 A | 7/2010 |
| JP | 2012-234287 A | 11/2012 |
| WO | 2012/147936 A1 | 11/2012 |

OTHER PUBLICATIONS

Kazuhito Hokamura, HTML5×CSS3 Kakushin before after, chapter 5, Interactive-na-dosa-no-jitsugen, WEB+DB PRESS, Gijutsu-Hyohron Co., Ltd., Sep. 25, 2010, vol. 58, First edition, p. 123-126 (well-known art).

The partial translation of Office Action for corresponding Japanese Patent Application No. 2015-506011 dated Apr. 14, 2015.

* cited by examiner

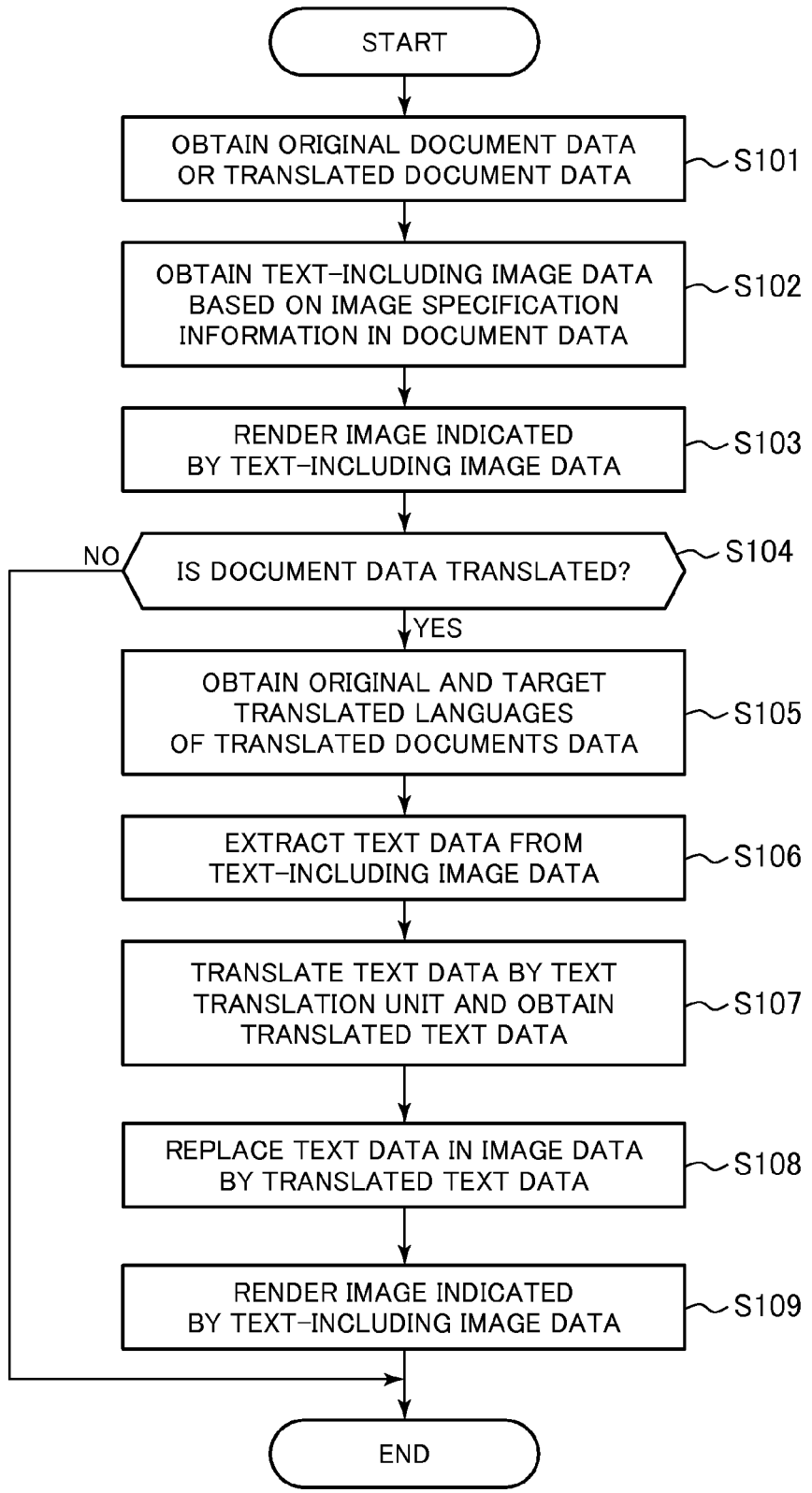

FIG.6

```
<html>
<head>
<script type="text/javascript">
    function checkText(){
        var obj = document.getElementById('sgv1');
        obj.onload = function(){
            if( checkTrans() ){                              ~S104
                var sl = getSourceLanguage();
                var tl = getTargetLanguage();                ~S105
                var doc = obj.contentDocument;
                var t = doc.getElementById('str1');          ~S106
                var str = t.textContent;
                                                             ~S107
                t.textContent = translate(str, sl, tl);
                                    )
            };                    S108
        };
    }
    ...
</script>
</head>
<body onload=checkText()>
                                                                21
...
<object data="http://img.x.jp/test.svg" width="400" height="300"
type="image/svg+xml" id="sgv1"></object>
...
```

FIG.7

```
<svg xmlns="http://www.w3.org/2000/svg"                                    23
xmlns:xlink="http://www.w3.org/1999/xlink" width="400" height="300">

<rect x="0" y="0" width="400" height="300" stroke="" fill="#eeeeee"
stroke-width="" />
    ...

<text id="str1" x="100" y="50" font-size="20pt">富士山</text>
                                                     24      25

</svg>
```

```
<html>
<head>
...
</head>
<body>
...
```
                                                              26

```
<svg xmlns="http://www.w3.org/2000/svg"
xmlns:xlink="http://www.w3.org/1999/xlink" width="400" height="300"
onload="
    var svg = this;
...
    var t = this.getElementById('str1');            S106
    changeString();
...
    function changeString(){
        var str = t.textContent;
        t.textContent = translate(str, sl, tl);     S107
    }
            S108
...
">
    <rect x="0" y="0" width="400" height="300" stroke=""
fill="#eeeeee" stroke-width="" />
...
    <text id="str1" x="100" y="50" font-size="20pt" >富士山
</text>
</svg>
...
```

FIG.11

```
<html>
<head>
<script type="text/javascript">
    function checkText() {
        var obj = document.getElementById('sgv1');
        obj.onload = function() {
            ...
            var doc = obj.contentDocument;
            var t = doc.getElementById('str1');
            var str = t.textContent;
            t.textContent = translate(str, sl, tl);
            ...
            obj.style.visibility="visible";
        };
    }
...
</script>
</head>
<body onload=checkText()>
...
<object data="http://img.x.jp/test.svg" width="200" height="200"
type="image/svg+xml" id="sgv1" style="visibility:hidden"></object>
...
```

37, 21, 36

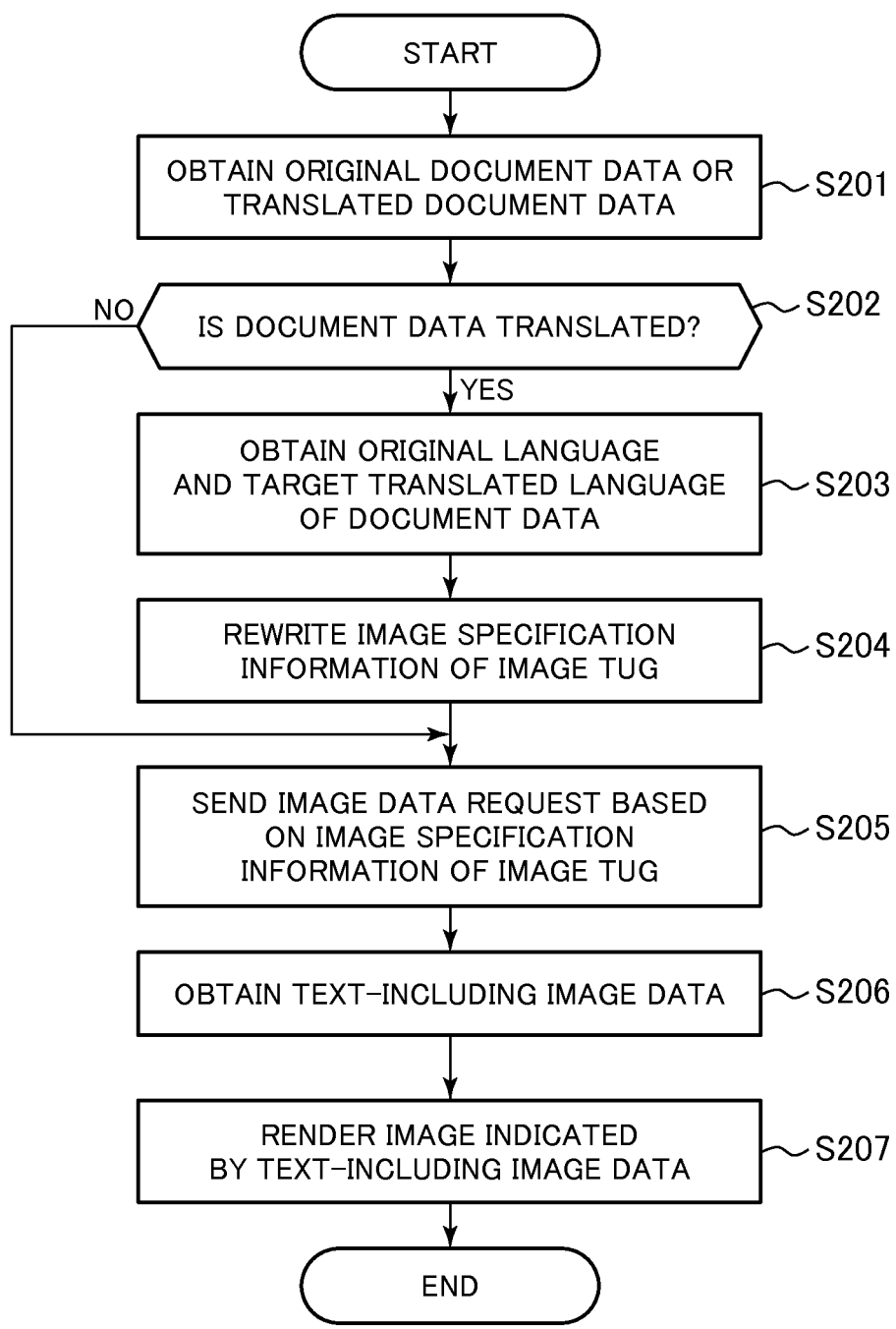

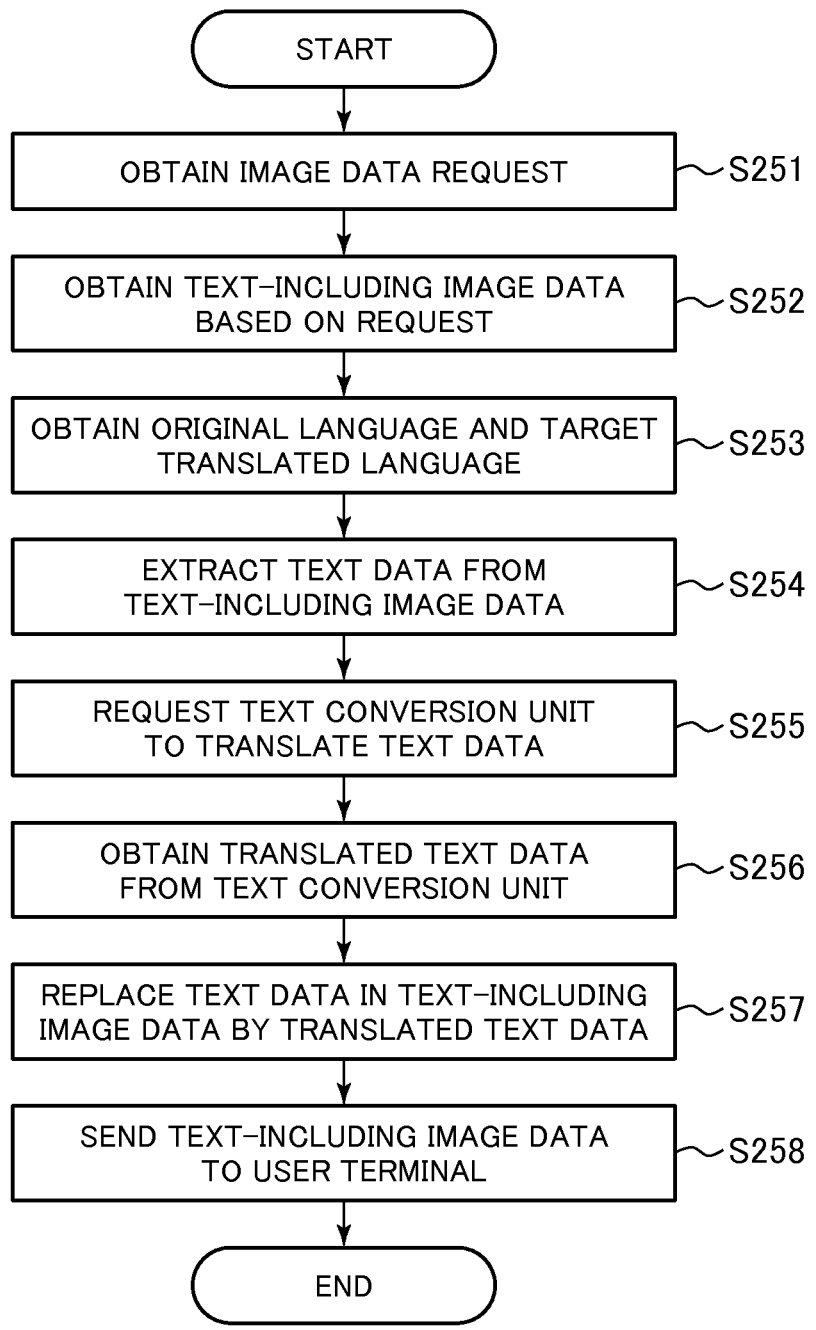

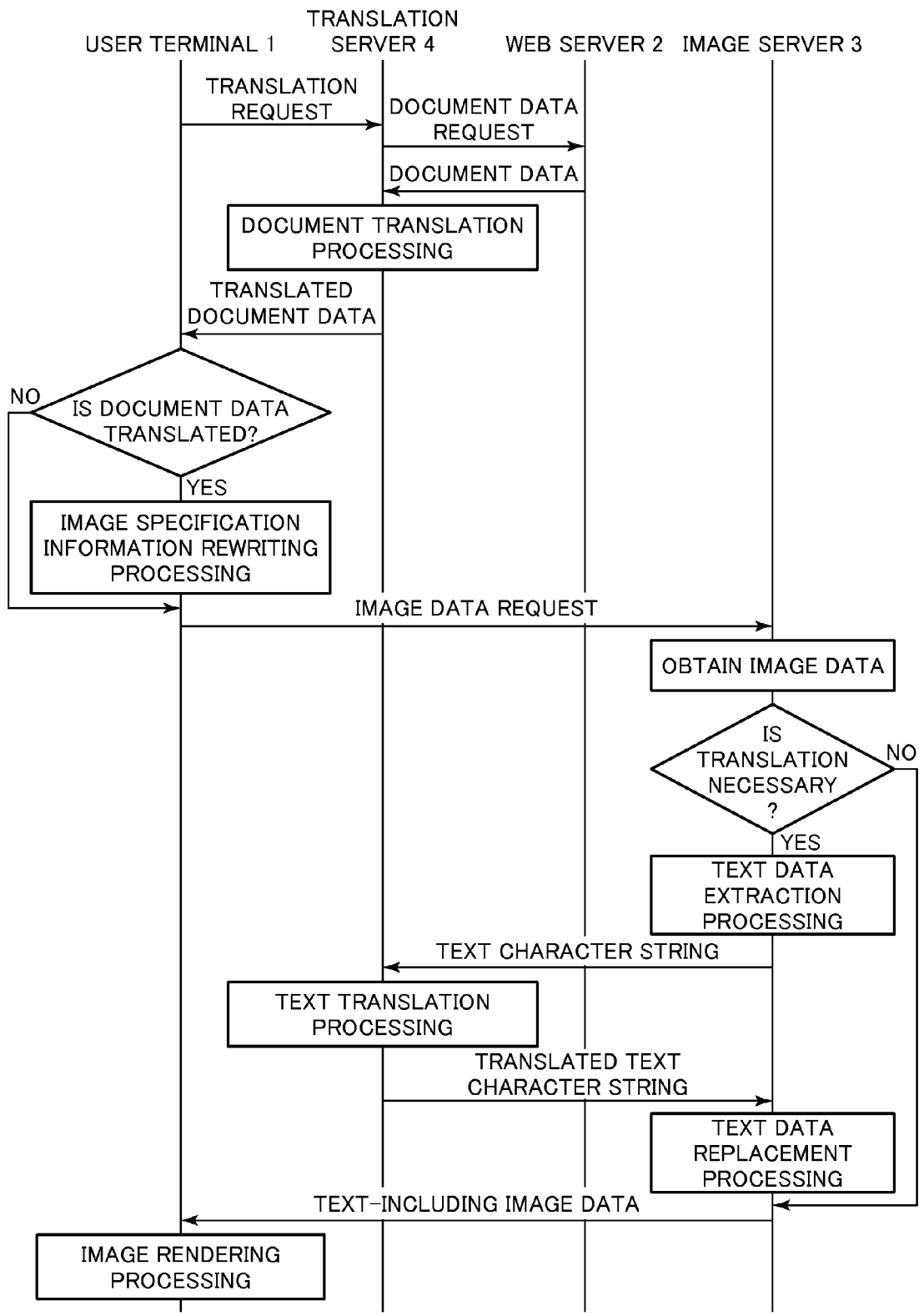

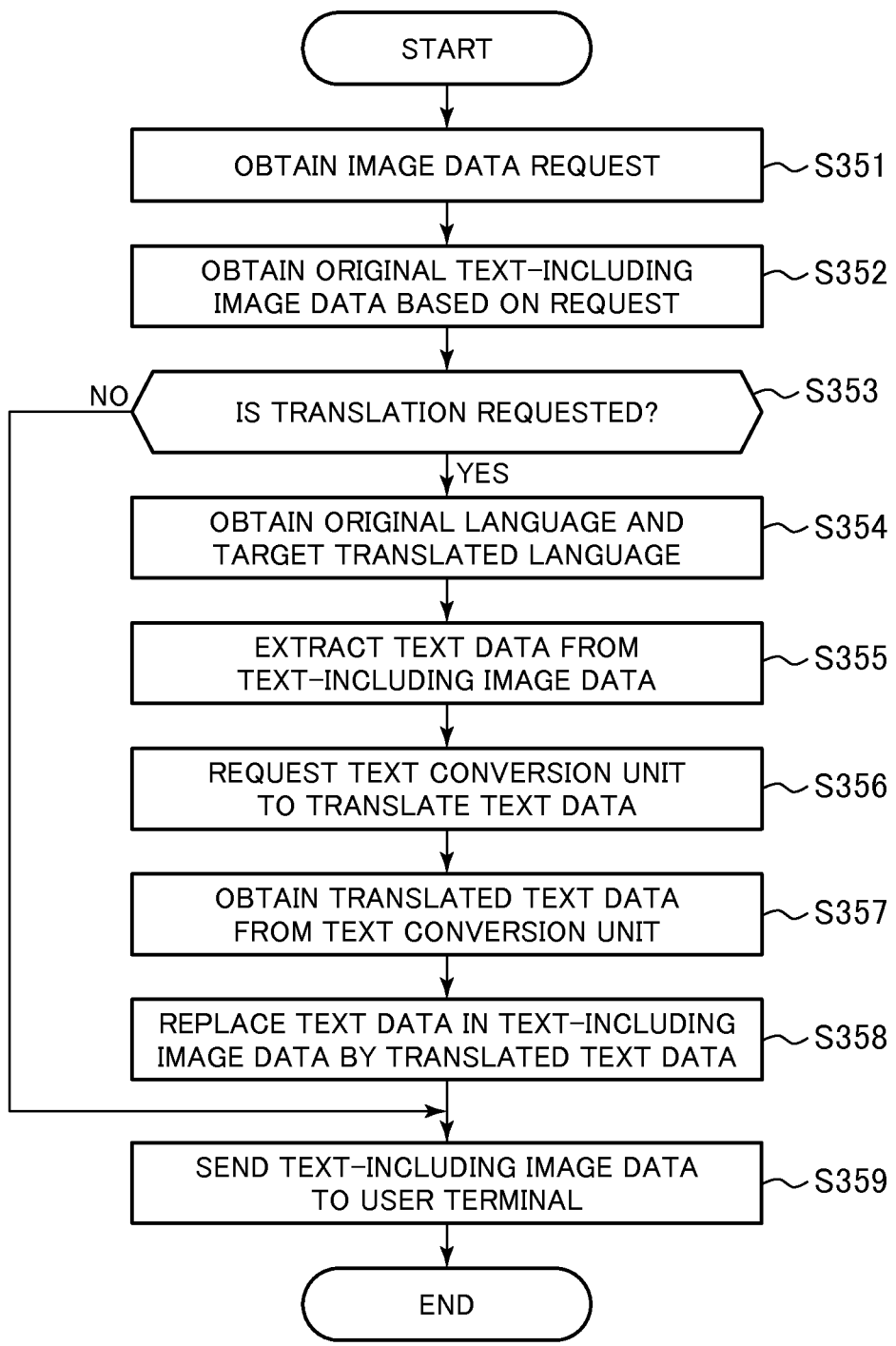

IMAGE CONVERSION AND METHOD FOR CONVERTING TEXT IN AN IMAGE INTO A TARGETED LANGUAGE

CROSS REFERENCE TO RELATED APPLICATIONS

This application is a National Stage of International Application No. PCT/JP2013/059748 filed on Mar. 29, 2013. The contents of the above document is incorporated herein by reference in its entirety.

TECHNICAL FIELD

The present invention relates to an information processing system, an information processing method, data, an information processing device, a display device, a display method, a program, and an information storage medium.

BACKGROUND ART

There has been available a system for translating a document, such as a web page or the like, written in a certain language into another language. In general, such a translation system does not translate a text embedded in an image included in a document. In order to address this point, Patent Literature 1 discloses a mechanism for sending, by a user terminal, text data included in a source of an original document or a translated document to an image server, and generating, by the image server, image data in which a text image indicated by the text data is superimposed on a background image prepared in advance to send back to the user terminal.

CITATION LIST

Patent Literature

[Patent Literature 1] WO2012/147936

SUMMARY OF INVENTION

Technical Problem

According to the technique which is described in Patent Literature 1 or so, the image server executes image processing of making a text image, based on converted text data, and then superimposing the text image onto a background image. This may result in a heavy processing load imposed on the image server, which is accessed from a plurality of clients, as image processing is generally complicated.

The present invention has been conceived in view of the above, and an object thereof is to provide a technique capable of reducing a processing load of a system, in particular, on a server side thereof, for displaying an image generated by superimposing a text indicated by converted text data onto an image prepared in advance.

Solution to Problem

In order to achieve the above described object, an information processing system according to the present invention includes an image data obtaining unit for obtaining text-including image data including text data and image data for displaying a text-including image in which a text indicated by the text data is superimposed on an image indicated by the image data; a converted text obtaining unit for obtaining converted text data resulting from conversion of the text data included in the text-including image data; a replacement unit for replacing the text data included in the image data by the converted text data; and a display control unit for causing a client to display a text-including image in which a text indicated by the replaced text data is superimposed on the image indicated by the image data, based on text-including image data including the replaced text data and the image data.

An information processing method according to the present invention includes a step of obtaining text-including image data including text data and image data for displaying a text-including image in which a text indicated by the text data is superimposed on an image indicated by the image data; a step of obtaining converted text data resulting from conversion of the text data included in the text-including image data; a step of replacing the text data included in the image data by the converted text data; and a step of causing a client to display a text-including image in which a text indicated by the replaced text data is superimposed on the image indicated by the image data, based on text-including image data including the replaced text data and the image data.

An information processing device according to the present invention includes an image data obtaining unit for obtaining text-including image data including text data and image data for displaying a text-including image in which a text indicated by the text data is superimposed on an image indicated by the image data; a converted text obtaining unit for obtaining converted text data resulting from conversion of the text data included in the text-including image data; a replacement unit for replacing the text data included in the image data by the converted text data; and a display control unit for causing a client to display a text-including image in which a text indicated by the replaced text data is superimposed on the image indicated by the image data, based on text-including image data including the replaced text data and the image data.

Data according to the present invention includes information for specifying text-including image data including text data and image data for displaying a text-including image in which a text indicated by the text data is superimposed on an image indicated by the image data; an instruction for obtaining converted text data resulting from conversion of the text data included in the text-including image data; an instruction for replacing the text data included in the image data by the converted text data; and an instruction for causing a client to display a text-including image in which a text indicated by the replaced text data is superimposed on the image indicated by the image data, based on text-including image data including the replaced text data and the image data.

A distribution device according to the present invention distributes the above described data.

A program according to the present invention causes to obtain text-including image data including text data and image data for displaying a text-including image in which a text indicated by the text data is superimposed on an image indicated by the image data; obtain converted text data resulting from conversion of the text data included in the text-including image data; replace the text data included in the image data by the converted text data; and cause a client to display a text-including image in which a text indicated by the replaced text data is superimposed on the image indicated by the image data, based on text-including image data including the replaced text data and the image data.

A computer readable storage medium according to the present invention stores the above described program.

A display device according to the present invention is a display device including a rendering unit for displaying on a screen, in response to a rendering designation by text-including image data including text data and image element data, a text-including image in which a text indicated by the text data is superimposed on an image indicated by the image data, further including: a unit for outputting, in a case where it is determined that it is necessary to convert the text included in the text-including image data because of content of document data indicating an electronic document correlated to the text-including image data, data capable of specifying a conversion rule for converting the text included in the text-including image data correlated to the document data to an image data conversion processing unit including a converted text obtaining unit for obtaining converted text data resulting from conversion of text data extracted from the text-including image data by a conversion unit according to the conversion rule and a replacement unit for replacing the text data included in the text-including image data by the converted text data; and a unit for obtaining the text-including image data including converted text data subjected to conversion according to the conversion rule from the image data conversion processing unit, and outputting to the rendering unit.

A display method according to the present invention causes a display device including a rendering unit for displaying on a screen, in response to a rendering designation by text-including image data including text data and image element data, a text-including image in which a text indicated by the text data is superimposed on an image indicated by the image data, to execute steps of outputting, in a case where it is determined that it is necessary to convert the text included in the text-including image data because of content of document data indicating an electronic document correlated to the text-including image data, data capable of specifying a conversion rule for converting the text included in the text-including image data correlated to the document data to an image data conversion processing unit including a converted text obtaining unit for obtaining converted text data resulting from conversion of text data extracted from the text-including image data by a conversion unit according to the conversion rule and a replacement unit for replacing the text data included in the text-including image data by the converted text data; and obtaining the text-including image data including converted text data subjected to conversion according to the conversion rule from the image data conversion processing unit, and outputting to the rendering unit.

A program according to the present invention causes a computer that constitutes a display device including a rendering unit for displaying on a screen, in response to a rendering designation by text-including image data including text data and image element data, a text-including image in which a text indicated by the text data is superimposed on an image indicated by the image data, to implement a function of outputting, in a case where it is determined that it is necessary to convert the text included in the text-including image data because of content of document data indicating an electronic document correlated to the text-including image data, data capable of specifying a conversion rule for converting the text included in the text-including image data correlated to the document data to an image data conversion processing unit including a converted text obtaining unit for obtaining converted text data resulting from conversion of text data extracted from the text-including image data by a conversion unit according to the conversion rule and a replacement unit for replacing the text data included in the text-including image data by the converted text data; and a function of obtaining the text-including image data including converted text data subjected to conversion according to the conversion rule from the image data conversion processing unit, and outputting to the rendering unit.

According to the present invention, it is possible to reduce a processing load of a system, in particular, on a server side thereof, for displaying an image in which a text indicated by converted text data is superimposed on an image prepared in advance.

In one embodiment of the present invention, the converted text obtaining unit may obtain the text data included in the text-including image data, and cause a conversion unit to convert the text data to obtain the converted text data.

In one embodiment of the present invention, the display control unit may cause the client to display an image in which the text indicated by the text data is not superimposed before the converted text data is obtained, and then display a text-including image in which the text indicated by the converted text data is superimposed on the image indicated by the image data after the converted text data is obtained.

According to this embodiment, it is possible to reduce discomfort caused in displaying an image before the conversion unit converts text data.

In one embodiment of the present invention, the information processing system may further include a document data obtaining unit for obtaining document data which includes image specification information that specifies the text-including image data and which is converted by the conversion unit, and the image data obtaining unit may obtain the text-including image data, based on the image specification information.

According to this embodiment, it is possible to obtain a method for accessing text-including image data before text data is converted, from the document data.

In one embodiment of the present invention, the document data obtaining unit may cause the conversion unit to convert the document data to thereby obtain the converted document data, and the converted text obtaining unit may cause the conversion unit to convert the text data, based on a parameter for use when the document data obtaining unit causes the conversion unit to convert the document data.

The information processing system may further include a document data obtaining unit for obtaining document data including image specification information that specifies the text-including image data; an image data transmission unit for sending text-including image data including the converted text data; and an image specification information replacement unit for replacing the image specification information by information for causing the converted text obtaining unit to convert the text data and cause the image data transmission unit to send text-including image data including the converted text data in a case where the document data is converted by the conversion unit.

According to this embodiment, it is possible to obtain a method for accessing text-including image data before text data is converted, from the document data.

In one embodiment of the present invention, the display device may further include a unit for determining whether or not it is necessary to convert the text included in the text-including image data, based on the content of the document data indicating the electronic document correlated to the text-including image data.

In one embodiment of the present invention, the program may be included in the text-including image data.

In one embodiment of the present invention, the program may be correlated to the document data.

BRIEF DESCRIPTION OF DRAWINGS

FIG. 5 shows one example of a processing flow of a user terminal according to the first embodiment;

FIG. 6 shows one example of document data;

FIG. 7 shows one example of text-including image data;

FIG. 10 shows one example of document data including text-including image data embedded therein;

FIG. 11 shows another example of document data;

FIG. 15 shows one example of a processing flow of a user terminal according to the second embodiment;

FIG. 16 shows one example of a processing flow of a web server according to the second embodiment;

FIG. 17 is a sequence diagram showing one example of an outline of processing in a translation system according to a third embodiment, and FIG. 18 shows one example of a processing flow of an image server according to the third embodiment.

DESCRIPTION OF EMBODIMENTS

Figure 1:
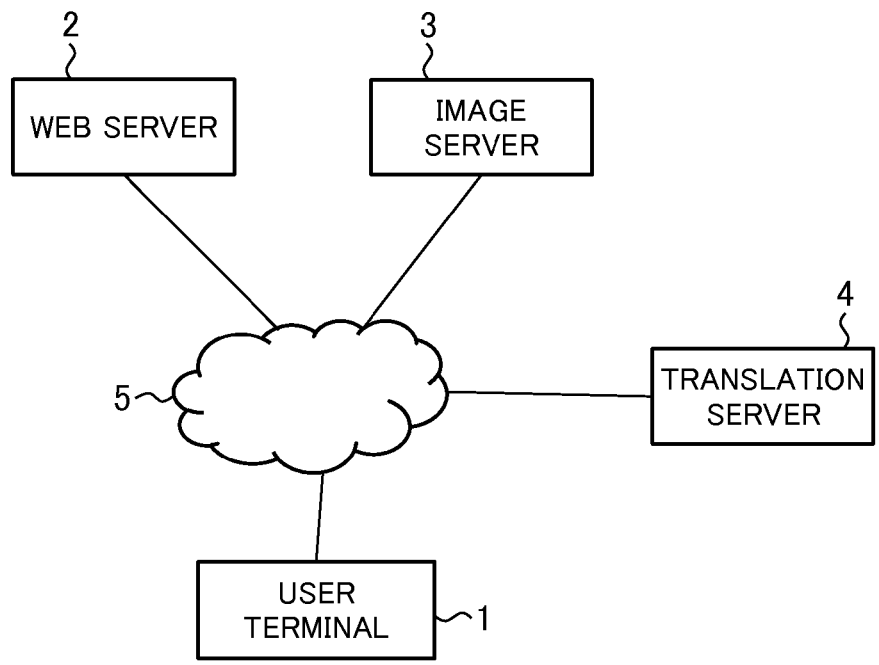
FIG. 1 shows one example of a structure of a translation system according to a first embodiment.

In the following, embodiments of the present invention will be described based on the drawings. As to structures with the same reference characters, a duplicate description is omitted.

First Embodiment

FIG. 1 shows one example of a system structure of a translation system according to a first embodiment. This translation system includes a user terminal 1, a web server 2, an image server 3, and a translation server 4, which are connected to each other via a network 5. The network 5 is, for example, a local area network, the Internet, and the like.

The user terminal 1 is a computer such as a personal computer, a tablet terminal, or the like, for example. Each of the web server 2, the image server 3, and the translation server 4 is a server computer. The web server 2 has a source of a web page document stored therein. Upon receipt of a request that utilizes document specification information (for example, URL) for specifying the location of a document from the user terminal 1 or other server, the web server 2 sends (distribute) document data corresponding to the document specification information as a response thereto. The image server 3 has text-including image data including text data and other image data stored therein, wherein the text-including image data is one type of image data. Upon receipt from the user terminal 1 or the like of a request that utilizes image specification information (for example, URL) for specifying a server where image data is available and the location in the server, the image server 3 sends image data corresponding to the URL as a response to the request. The translation server 4 is a server that translates a document or a sentence designated by a user. In the web server 2, the image server 3, and the translation server 4, a web server program (referred also as an http daemon) is executed.

Figure 2:
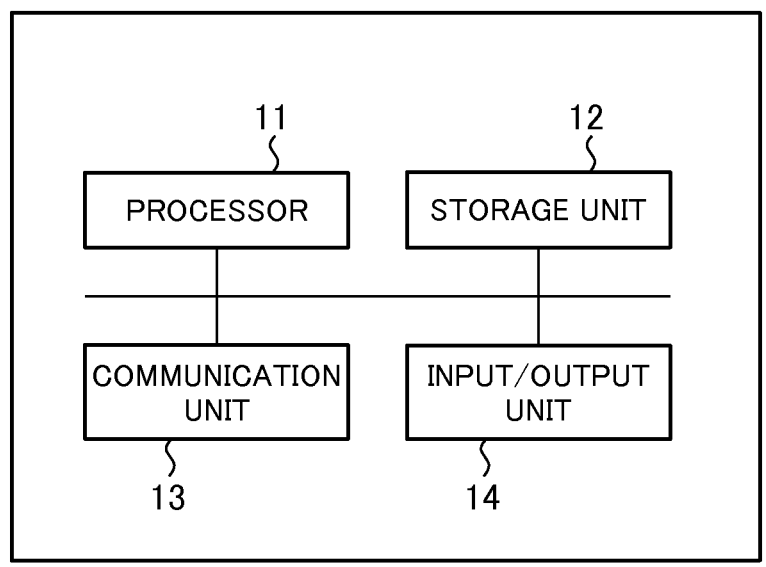
FIG. 2 shows one example of a hardware structure of a user terminal and a server.

FIG. 2 shows one example of a hardware structure of the user terminal 1, the web server 2, the image server 3, and the translation server 4. Each of the user terminal 1, the web server 2, the image server 3, and the translation server 4 includes a processor 11, a storage unit 12, a communication unit 13, and an input/output unit 14.

The processor 11 operates according to a program stored in the storage unit 12. The processor 11 controls the communication unit 13 and the input/output unit 14. The above mentioned program may be provided via the Internet or the like or as being stored in a computer readable storage medium, such as a flash memory, a DVD-ROM, or the like.

The storage unit 12 is made using a memory device, such as a RAM, a flash memory, or the like, or a hard disk drive. The above mentioned program is stored in the storage unit 12. In addition, the storage unit 12 stores information inputted from respective units and an operation result.

The communication unit 13 implements a function for communicating with other devices, and is made using, for example, an integrated circuit and an antenna of a wireless LAN or the like. Under control by the processor 11, the communication unit 13 inputs information received from other devices into the processor 11 and/or the storage unit 12, and sends information to other devices.

The input/output unit 14 is made using a video controller for controlling a display output means or a controller for obtaining data from an input device. An input device includes a keyboard, a mouse, a touch panel, or the like. Under control by the processor 11, the input/output unit 14 outputs display data to a display output device, and obtains data inputted by a user by operating an input device.

Figure 3:
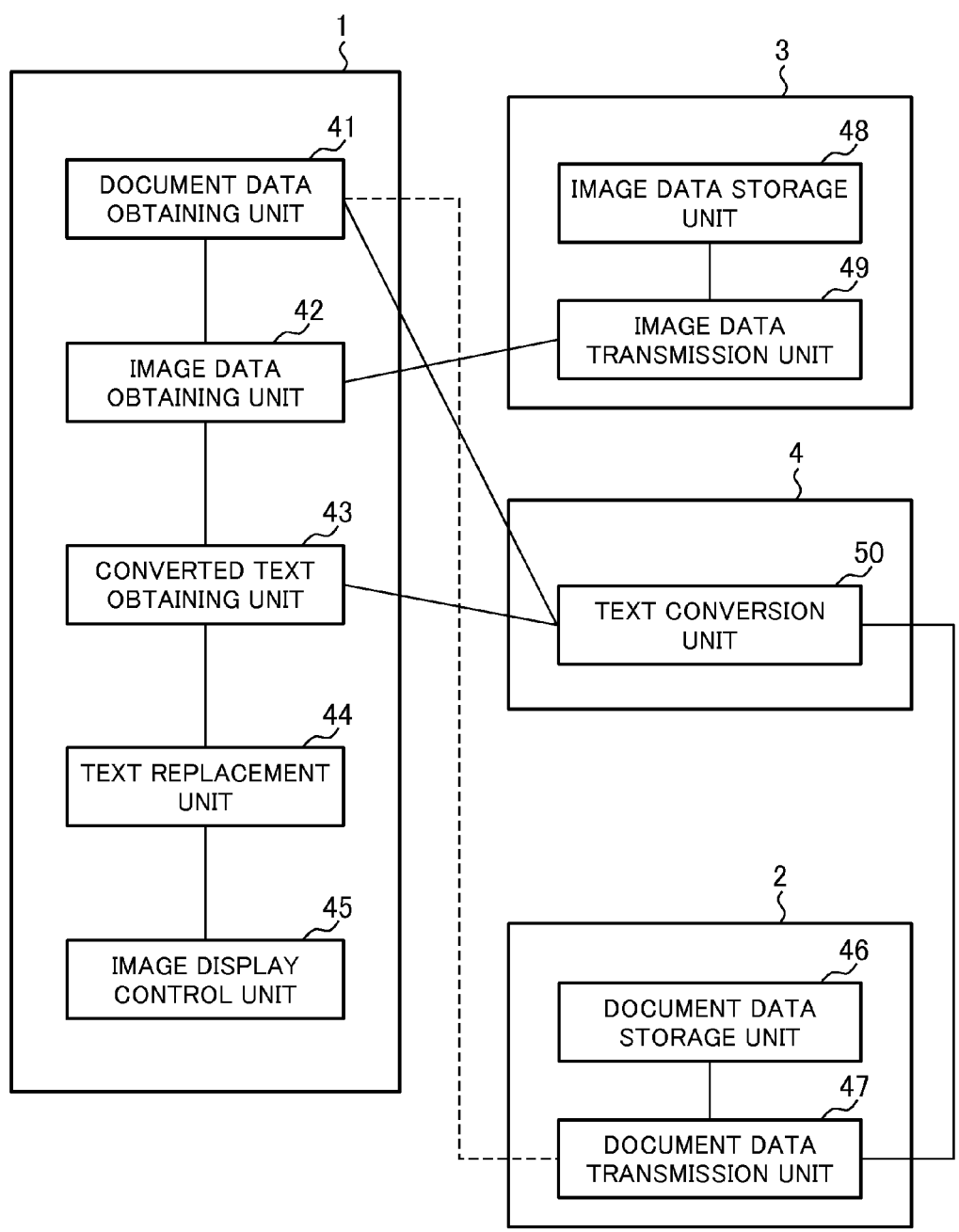
FIG. 3 is a functional block diagram showing functions implemented in a translation system according to the first embodiment.

FIG. 3 is a functional block diagram showing functions implemented in the translation system according to the first embodiment. The translation system according to the first embodiment functionally includes a document data obtaining unit 41, an image data obtaining unit 42, a converted text obtaining unit 43, a text replacement unit 44, an image display control unit 45, a document data storage unit 46, a document data transmission unit 47, an image data storage unit 48, an image data transmission unit 49, and a text conversion unit 50.

The user terminal 1 implements the document data obtaining unit 41, the image data obtaining unit 42, the converted text obtaining unit 43, the text replacement unit 44, and the image display control unit 45. The web server 2 implements the document data storage unit 46 and the document data transmission unit 47. The image server 3 implements the image data storage unit 48 and the image data transmission unit 49. The translation server 4 implements the text conversion unit 50. More specifically, each of these functions is processed by the processor 11 included in a user terminal 1 or the like that implements the function by executing a program stored in the storage unit 12 to control the communication unit 13 or the like.

Figure 4:
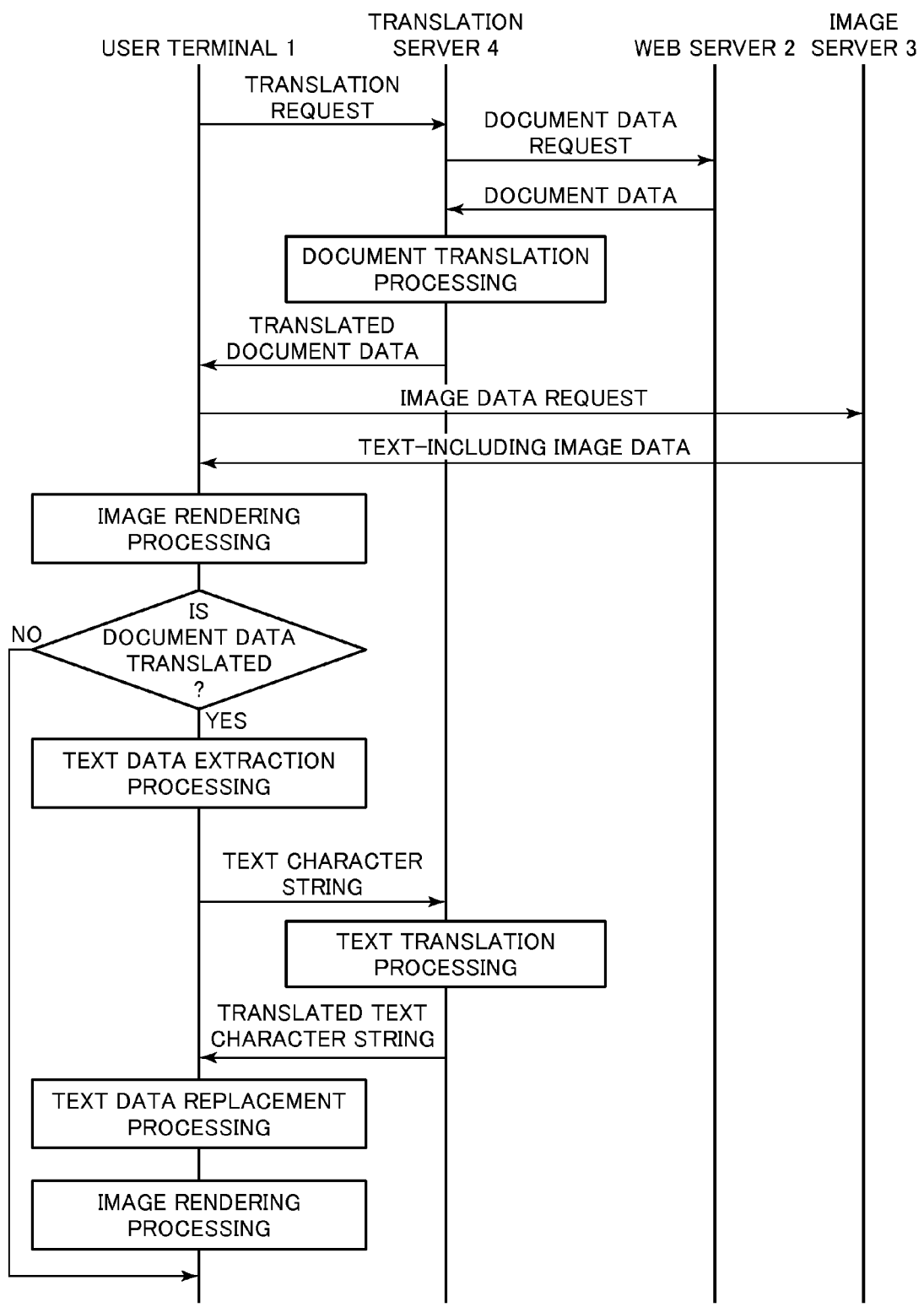
FIG. 4 is a sequence diagram showing one example of an outline of processing in a translation system according to the first embodiment.

In the following, each function will be described with reference to the drawings such as a sequence diagram. FIG. 4 is a sequence diagram showing one example of an outline of processing in the translation system according to the first embodiment. A case of handling text-including image data will be mainly described below.

The document data obtaining unit 41 included in the user terminal 1 is implemented mainly using the processor 11, the storage unit 12, and the communication unit 13 of the user terminal 1. The document data obtaining unit 41 sends a translation request to the text conversion unit 50, and receives and thereby obtains translated document data from the text conversion unit 50. This translation request is information for requesting translated document data. The document data obtaining unit 41 is implemented according to a program of a browser, for example. That is, for example, when a user designates an URL of a translation service available in the translation server 4, then inputs, on a translation request screen displayed thereupon by a browser, document specification information (specifically, an URL that specifies a server and a stored location in the server) that is information that specifies the location of document data, and presses a button or the like for instructing translation, the document data obtaining unit 41 sends a translation request including the document specification information to the text conversion unit 50. Thereafter, the document data obtaining unit 41 obtains translated document data sent from the text conversion unit 50 as a response to the translation request.

In the following, a flow from sending a translation request to sending translated document data will be described. The text conversion unit 50 included in the translation server 4 is implemented mainly using the processor 11, the storage unit 12, and the communication unit 13. The text conversion unit 50 obtains a translation request including information (document specification information) that specifies the location of document data from the user terminal 1, and translates the document data stored in the web server 2. More specifically, the text conversion unit 50 executes the following processing. That is, the text conversion unit 50 obtains the document specification information, the original language, and the target translated language from the translation request, then sends a document data request including the document specification information to a web server 2 that is a server specified by the document specification information. Thereafter, the text conversion unit 50 obtains document data from the web server 2, and then translates the text data (assumed written in the original language), which is a display target, included in the document data into the target translated language (document translation processing in FIG. 4). Thereafter, the text conversion unit 50 sends the translated document data to the user terminal 1. In the above, the text data is data written in the character code and indicating a text to be displayed. Note that although, in this embodiment, the text conversion unit 50 translates the text data included in the document, text data may be converted according to other methods. For example, the text conversion unit 50 may add a space or a symbol to text data according to a predetermined conversion rule. Translation as well is one type of conversion rule, and a target translated language and an original language are parameters that define the conversion rule.

The document data storage unit 46 included in the web server 2 is implemented mainly using the storage unit 12. The document data storage unit 46 has document data stored therein. Document data is data written in a format such as HTML, XML, or the like, for example, and includes image specification information that specifies the location of text-including image data. Specifically, the image specification information is an URL of text-including image data, and includes information that specifies a server and information that specifies the location of the image data in the server. The document data (for example, a source of HTML) may include text-including image data itself (for example, a source in SVG format) instead of the image specification information.

The document data transmission unit 47 included in the web server 2 is implemented mainly using the processor 11, the storage unit 12, and the communication unit 13. The document data transmission unit 47 receives a document data request sent from the user terminal 1 or the translation server 4, and sends document data corresponding to the request back to the sender.

The image data obtaining unit 42 included in the user terminal 1 is implemented mainly using the processor 11, the storage unit 12, and the communication unit 13. The image data obtaining unit 42 obtains text-including image data from the image server 3. More specifically, the image data obtaining unit 42 obtains image specification information included in the document data, and sends an image data request including the image specification information to the image server 3 that is a server indicated by the image specification information. Thereafter, the image data obtaining unit 42 receives and thereby obtains text-including image data specified by the image specification information from the image server 3.

In the above, the image data includes text data and one or more image element data. Text data is data written in the character code. One or more image element data is data indicating an element that constitutes an image, being specifically an element other than the text data here. Collection of the one or more image element data is one type of image data, being hereinafter referred to as "background image data". The format of the text-including image data can be any format that can include text data itself as image data and display the text data as an image. The following description is made based on an assumption that the text-including image data is written in SVG format. This processing is specifically implemented according to a program of a browser.

The image data storage unit 48 implemented by the image server 3 is implemented mainly using the storage unit 12. The image data storage unit 48 has image data stored therein.

The image data transmission unit 49 implemented by the image server 3 is implemented mainly using the processor 11, the storage unit 12, and the communication unit 13. The image data transmission unit 49 receives an image data request sent from the user terminal 1 or the translation server 4, and sends image data corresponding to the request to the sender.

Note that in a case where translation is not applied, the document data obtaining unit 41 sends a document data request directly to the web server 2 to request document data, and obtains document data from the web server 2. This case includes a case, for example, in which a user inputs on a general browser an URL that indicates the location of document data in the web server 2.

The image display control unit 45 included in the user terminal 1 is implemented mainly using the processor 11, the storage unit 12, and the input/output unit 14. The image display control unit 45 controls such that an image indicated by the text-including image data is displayed on a display output means. More specifically, the image display control unit 45 superimposes an image of a text indicated by the text data included in the text-including image data onto an image indicated by the background image data to thereby generate raster data of a text-including image, and causes a display means to display a text-including image subjected to superimposition. The image display control unit 45 is implemented by a browser by executing an image tug 21 or a script in the document data. Being triggered by obtaining the text-including image data by the image data obtaining unit 42, the image display control unit 45 renders an image indicated by the text-including image data (upper "image rendering processing" in FIG. 4). Strictly speaking, the image rendering is executed in parallel to subsequent processing.

In the following, processing that is executed in a case where the document data is subjected to translation will be described. The converted text obtaining unit 43 included in the user terminal 1 is implemented mainly using the processor 11, the storage unit 12, and the communication unit 13. The converted text obtaining unit 43 obtains converted text data resulting from conversion of the text data included in the text-including image data by the text conversion unit 50. More specifically, the converted text obtaining unit 43 executes the processing described below. That is, in a case where the document data is subjected to translation, the converted text obtaining unit 43 extracts text data included in the received text-including image data (text data extraction processing in FIG. 4), and obtains the original language and the target translated language of the document data. Then, the converted text obtaining unit 43 sends the extracted text data and a translation request including the original and target translated languages to the text conversion unit 50 to receive and thereby obtain translated text data as converted text data from the text conversion unit 50. In the above, when the text conversion unit 50 receives a translation request together with the text data, the text conversion unit 50 translates the text data (assumed written in the original language) into the target translated language (text translation processing" in FIG. 4). Then, the text conversion unit 50 sends the translated text data to the user terminal 1. Note that the text data conversion method employed when the text conversion unit 50 receives a translation request including document specification information is the same as that when a translation request including the text data itself is received. The text conversion unit 50 translates the text data into the target translated language in both cases.

The text replacement unit 44 included in the user terminal 1 is implemented mainly using the processor 11 and the storage unit 12. When the converted text obtaining unit 43 obtains the translated text data, the text replacement unit 44 replaces the text data before conversion included in the text-including image data by the translated text data ("text data replacement processing" in FIG. 4).

Being triggered by the replacement of the text data by the text replacement unit 44, the image display control unit 45 renders an image indicated by the text-including image data (lower "image rendering processing" in FIG. 4).

In the following, details of the processing by the user terminal 1 will be further described referring to a flowchart and a source of document data. FIG. 5 shows one example of a processing flow of the user terminal 1. FIG. 6 shows one example of a source of document data. The format of the source of document data shown in FIG. 5 is html, and Java script is embedded. The following processing is executed by a browser by interpreting a user operation and/or an instruction in html or in the script.

Initially, the document data obtaining unit 41 obtains original document data not translated or translated document data (step S101). This processing is executed by a browser based on a user operation.

Then, the image data obtaining unit 42 obtains text-including image data 22, based on the image specification information included in the document data (step S102). The image data obtaining unit 42 is implemented by a browser by executing processing, based on the image tug 21 included in the document data. The image tug 21 includes image specification information for text-including image data and information indicating an attribute, such as the size or the like, of an image displayed based on the text-including image data. The position of the image tug 21 defines the position of the image in the document.

FIG. 7 shows one example of the text-including image data 22. The image data 22 shown in FIG. 7 is SVG data, and includes a text tug 24, that is, information including text data 25 indicating a text to be displayed as a text-including image and attribute, such as the size, the position or the like, of the text, and background image data 23, that is, information other than those.

Figure 8:
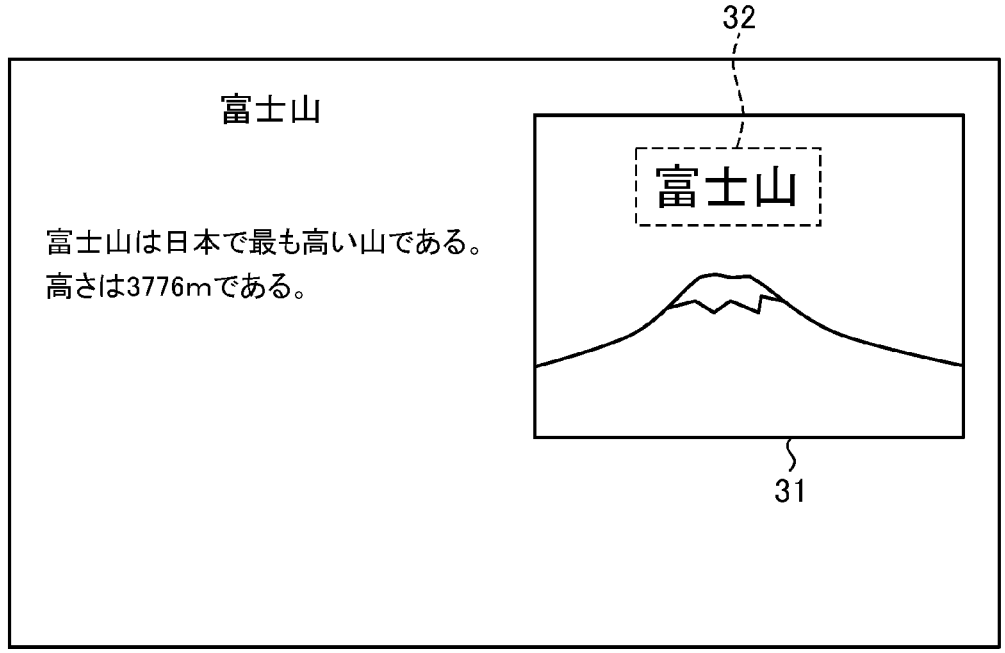
FIG. 8 shows one example of a screen in which an original document before translation is displayed.

FIG. 8 shows one example of a screen in which original document before translation is displayed. Specifically, FIG. 8 shows a screen in which a main text corresponding to the main sentence of the original document and paragraphed and a display image 31 in which a display text 32 is embedded are displayed. The image shown in FIG. 8 corresponds to the image data 22 shown in FIG. 7.

Then, the image display control unit 45 renders an image indicated by the image data (step S103). More specifically, the image display control unit 45 is implemented by a browser by interpreting and processing an image tug and a script of the document data. More specifically, after the image data obtaining unit 42 receives the image data 22 based on the image tug 21 included in the document data, the image display control unit 45 renders an image, based on the document data and the image data 22. In rendering a text-including image, the image display control unit 45 superimposes an image of a text indicated by the text data included in the text-including image data onto an image indicated by the background image data to thereby generate raster data of the text-including image, and causes a display means to display the text-including image subjected to superimposition, the main text, or the like. For facilitating the explanation, it is described in the processing flow shown in FIG. 5 that the image rendering processing is executed between steps S102 and S104. However, in actuality, the image display control unit 45 executes the processing of rendering an image indicated by the document data and the text-including image data in parallel to other processing. Therefore, the processing at step S103 may be executed later after receipt of the text-including image data 22.

Then, the converted text obtaining unit 43 determines whether or not the document data is translated (step S104). More specifically, the converted text obtaining unit 43 obtains a referrer of the main document data, and finds whether or not the character string of the referrer is one for a translation request to thereby know whether or not the document data is translated. A referrer includes an URL and the like stored therein for obtaining main document data, and a character string of a translation request includes an URL of a translation service, document specification information that specifies the original document data, and a parameter such as the original and target translated languages or the like. Step S104 is executed by a browser by executing a script in the document data. Note that an area in FIG. 6 is correlated to the step in FIG. 5 given the same reference symbol. "Checktrans ( )" shown in FIG. 6 is a function for determining, to return, whether or not a translation request has been made, based on the character string of a referrer. Note that the processing from step S105 to S108 described below as well is executed by a browser by executing a script in the document data.

In a case where the document data is translated (Y at step S104), the converted text obtaining unit 43 obtains the original language and the target translated language of the translated document data (step S105). More specifically, the converted text obtaining unit 43 obtains the original language and the target translated language, based on the description concerning the original language and the target translated language included in the referrer (same data as the translation request). In the script shown in FIG. 6, information indicating the original language is included in variable sl, and information indicating the target translated language is included in variable tl. Meanwhile, in a case where the document data is not translated (N at step S104), the processing at step S105 and thereafter is skipped.

Then, the converted text obtaining unit 43 extracts text data from the text-including image data 22 (step S106). In the example shown in FIG. 6 and FIG. 7, the converted text obtaining unit 43 obtains the text data 25 from the text tug 24 including str1, which is an ID designated in advance.

Having obtained the text data 25, the converted text obtaining unit 43 requests the text conversion unit 50 to convert the text data 25, and obtains translated text data (step S107). More specifically, the converted text obtaining unit 43 sends the text data 25 and a translation request including information concerning the original and target translated languages to the text conversion unit 50, and receives text data translated by the text conversion unit 50. "Translate (str,sl,tl)" in FIG. 6 corresponds to this processing.

Then, the text replacement unit 44 replaces the text data 25 included in the text-including image data 22 by the translated text data (step S108).

Being triggered by the replacement of the text data 25 included in the text-including image data 22, the image display control unit 45 renders again an image indicated by the text-including image data (step S109).

Figure 9:
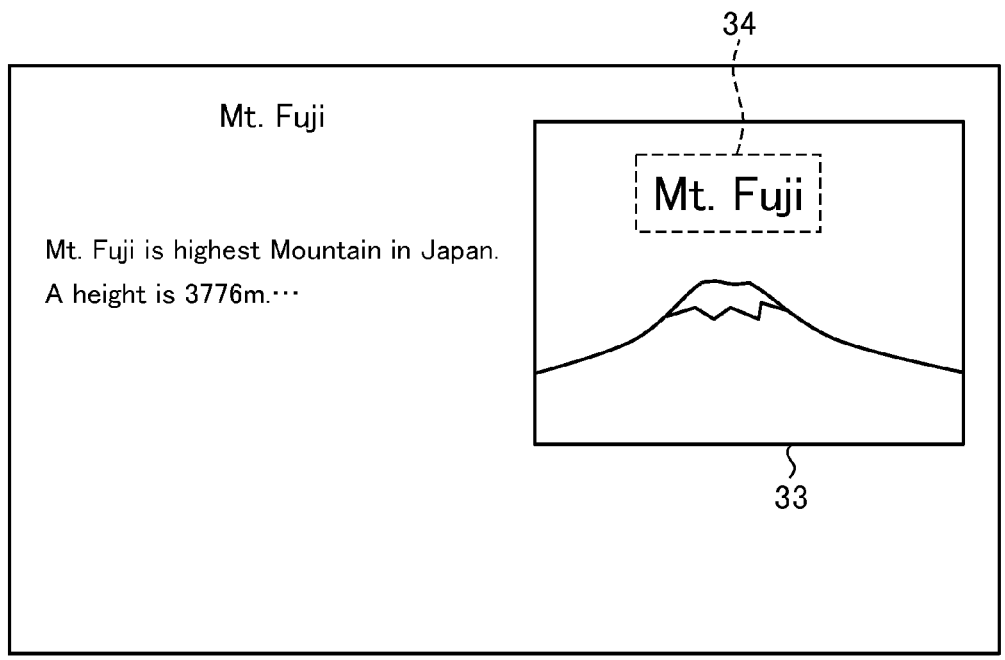
FIG. 9 shows one example of a screen in which a document including an image with replaced text data is displayed.

Through the above described processing, an image of a document including the translated text data of the main sentence of the document and the translated text data included in the image is displayed on a display means. FIG. 9 shows one example of a screen in which a document including an image with the replaced text data is displayed. Specifically, FIG. 9 shows a screen in which a translated text data corresponding to the main sentence of the document and paragraphed, and a display image 33 in which a display text 34, which is the translated text data, is embedded are displayed. In the example shown in FIG. 9, the original language is Japanese and the target translated language is English. The text data corresponding to the main sentence of the document and the display text 34 embedded in the display image 33 are translated from Japanese to English by the text conversion unit 50.

With the above, processing of superimposing a text image onto a background image is executed in the user terminal 1, which is a client, with respect to text-including image data, and a load on the server side is accordingly reduced. Further, as the text data is included in the text-including image data, it becomes easier to use the text-including image data, irrespective of the specification on the server side. This can facilitate not only insertion of a text-including image into a document but also use of displaying a text-including image alone and generation of an index for similar image search for a text-including image.

Moreover, the text-including image data becomes readily available as a target of processing by an image search engine or the like via the Internet. This is because that makes it possible to embed, in document data, image specification information that specifies text-including image data in a general format irrelevant to the specification for text conversion. This enhances likelihood that the text-including image data becomes a search target via document data.

Note that although text-including image data is obtained using the image specification information after document data is received in the above description, text data included in the text-including image data included in the document data may be converted. In this case, the processing at step S102 is not executed.

FIG. 10 shows one example of document data including the text-including image data 26 embedded therein. As shown in FIG. 10, a script for the processing from step S104 to step S108 may be included in the text-including image data in the document data.

According to the script in the document data shown in FIG. 6, text data before translation included in the image data may be displayed. However, the text data may not be displayed.

FIG. 11 shows another example of the document data. In the example shown in FIG. 11, the image attribute designed by the image tug 21 is set in advance to hidden attribute for not displaying an image. This is set in advance, using a hidden description 36 shown in FIG. 11. After step S108, the image attribute is changed to visible attribute, using the visible description 37. With the above, step S103 is skipped even when the text-including image data 22 is read, and after replacement of the text data included in the text-including image data 22, the image display control unit 45 displays an image indicated by that text-including image data 22.

Figure 12:
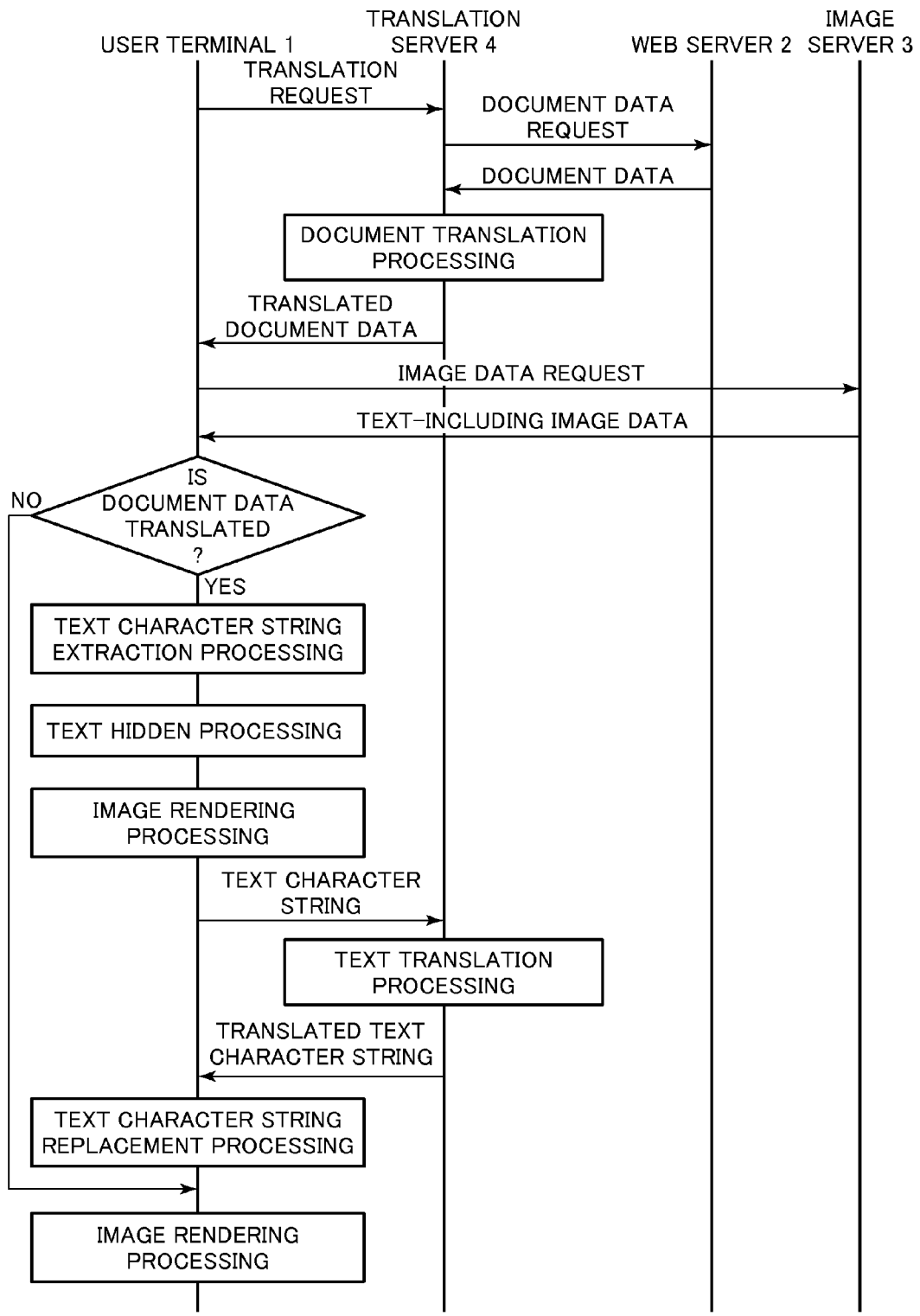
FIG. 12 is a sequence diagram showing another example of an outline of processing in a translation system according to the first embodiment.

As a method for displaying an image indicated by the image data, a different method may be employed. FIG. 12 is a sequence diagram showing another example of an outline of processing in the translation system according to the first embodiment. This processing is different from the example shown in FIG. 4 in that an image is rendered while keeping hidden the text indicated by the text data ("text hidden processing" in FIG. 12), and a text indicated by the translated text data is thereafter rendered again. In order to implement this sequence, the image display control unit 45 causes to display an image indicated by the background image data before the translated text data is obtained, and then causes to display an image in which the text indicated by the translated text data is superimposed on the background data indicated by the background image data after the translated text data is obtained. More specifically, for example, the image tug 21 is set for hidden, as the image data shown in FIG. 11 ("text hidden processing" in FIG. 12), and it is described as a script in the document data such that the text data included in the image data is erased and the image attribute is changed to visible attribute before the processing by the text conversion unit 50 to convert the text data. Alternatively, the attribute of the text tug may be set hidden, instead of erasing the text data.

With the above, in a case where the processing by the text conversion unit 50 takes time, it is possible not to display the text before translated and to display an image indicated by the background image data before completion of the processing. In view of a point that it is better not to display a text yet to be translated, this example is more preferable to the examples shown in FIGS. 5 and 6. Meanwhile, in view of a point that the period of time with no image displayed is made shorter, this example is more preferable to the example shown in FIG. 10. The example described with reference to FIG. 12 can make inconvenience for a user in viewing an image as small as possible.

Second Embodiment

A second embodiment is different from the first embodiment mainly in that an operation of extracting and replacing text data included in image data is executed by a server other than the image server 3, rather than by the user terminal 1. In the following, difference of the second embodiment from the first embodiment is mainly described. A hardware structure is not different and thus not described.

Figure 13:
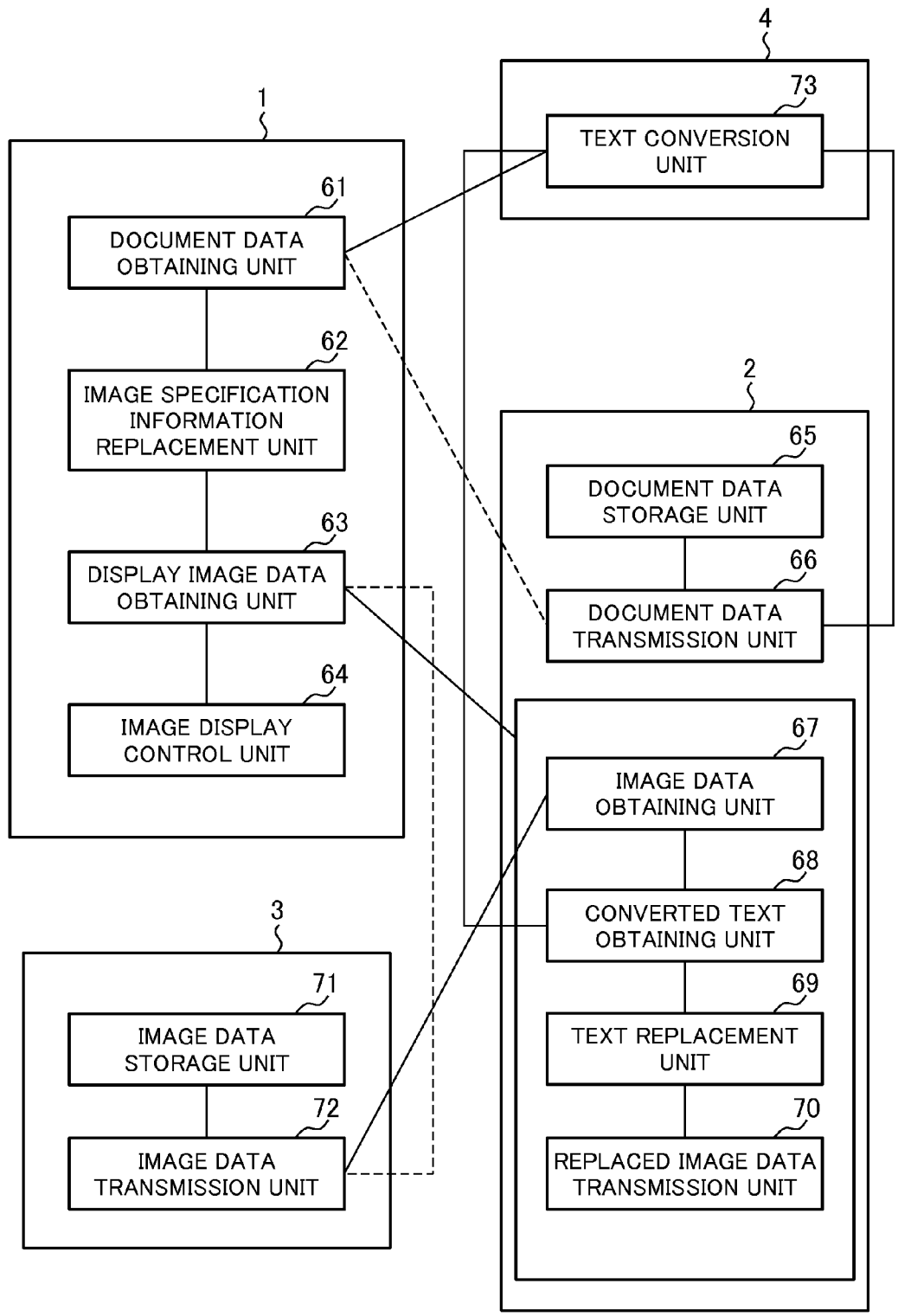
FIG. 13 is a functional block diagram showing functions implemented in a translation system according to a second embodiment.

FIG. 13 is a functional block diagram showing functions implemented in a translation system according to the second embodiment. The translation system according to the second embodiment functionally includes a document data obtaining unit 61, an image specification information replacement unit 62, a display image data obtaining unit 63, an image display control unit 64, a document data storage unit 65, a document data transmission unit 66, an image data obtaining unit 67, a converted text obtaining unit 68, a text replacement unit 69, a replaced image data transmission unit 70, an image data storage unit 71, an image data transmission unit 72, and a text conversion unit 73.

The user terminal 1 implements the document data obtaining unit 61, the image specification information replacement unit 62, the display image data obtaining unit 63, and the image display control unit 64. The web server 2 implements the document data storage unit 65, the document data transmission unit 66, the image data obtaining unit 67, the converted text obtaining unit 68, the text replacement unit 69, and the replaced image data transmission unit 70. The image server 3 implements the image data storage unit 71 and the image data transmission unit 72. The translation server 4 implements the text conversion unit 73. More specifically, each of these functions is processed by the processor 11 included in a user terminal 1 or the like that implements the function by executing a program stored in the storage unit 12 to control the communication unit 13 or the like.

The document data obtaining unit 61, the document data storage unit 65, the document data transmission unit 66, the image data storage unit 71, the image data transmission unit 72, and the text conversion unit 73 are same functions as the document data obtaining unit 41, the document data storage unit 46, the document data transmission unit 47, the image data storage unit 48, the image data transmission unit 49, and the text conversion unit 50, respectively, in the first embodiment. In the following, remaining functions will be mainly described with reference to the drawings such as a sequence diagram or the like.

Figure 14:
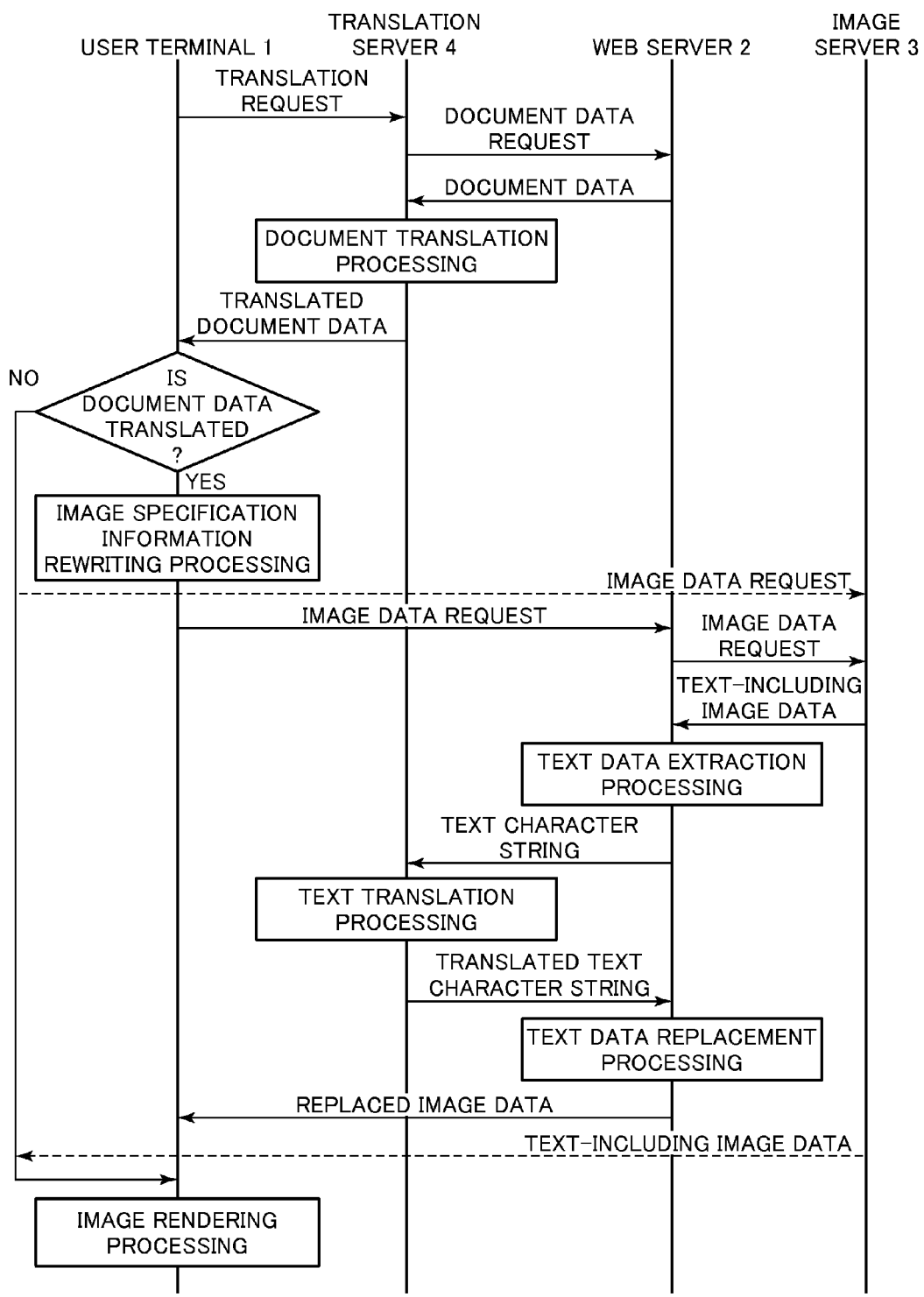
FIG. 14 is a sequence diagram showing one example of an outline of processing in a translation system according to the second embodiment.

FIG. 14 is a sequence diagram showing one example of an outline of processing in a translation system according to the second embodiment. The processing after the document data obtaining unit 61 sends a translation request to the text conversion unit 50 to request translated document data until the document data obtaining unit 61 obtains translated document data from the text conversion unit 50 is similar to that in the first embodiment, and thus not described.

The image specification information replacement unit 62 is implemented mainly using the processor 11 and the storage unit 12. In a case where the document data is subjected to conversion by the text conversion unit 73, the image specification information replacement unit 62 rewrites the image specification information included in an image tug in the document data into conversion request information (image specification information rewriting processing in FIG. 14). Conversion request information is image specification information indicating that a request is made to the web server 2 to request sending of text-including image data with the text data converted by the text conversion means (hereinafter referred to as "replaced image specification information"). Specifically, the processing which is requested includes obtaining, by the image data obtaining unit 67, text-including image data from the image server 3, obtaining, by the converted text obtaining unit 68, converted text data resulting from conversion of the text data included in the text-including image data, replacing, by the text replacement unit 69, the text data included in the text-including image data by the converted text data, and sending, by the replaced image data transmission unit 70, the text-including image data including the converted text data (these to be collectively referred to as "image data conversion process").

Note here that the original image specification information is, for example, an URL that indicates the image server 3 and the location of the text-including image data, and the replaced image specification information is an URL indicating information indicating API of the image data conversion processing in the web server 2, information indicating the location of the text-including image data in the image server 3, and the original and target translated languages.

The display image data obtaining unit 63 included in the user terminal 1 is implemented mainly using the processor 11, the storage unit 12, and the communication unit 13. In a case where the image specification information is rewritten, the display image data obtaining unit 63 sends, to image data conversion process, an image data request for text-including image data with the replaced text data (hereinafter referred to also as "rewritten image data request"), based on the rewritten image specification information. Meanwhile, in a case where the image specification information is not rewritten, the display image data obtaining unit 63 sends an image data request for text-including image data to the image server 3, and obtains text-including image data as a response.

The image data obtaining unit 67 included in the web server 2 is implemented mainly using the processor 11, the storage unit 12, and the communication unit 13. The image data obtaining unit 67 sends an image data request to the image server 3, based on the information that specifies the location of the original text-including image data (before translation) included in the rewritten image data request, and obtains image data from the image server 3.

The converted text obtaining unit 68 included in the web server 2 is implemented mainly using the processor 11, the storage unit 12, and the communication unit 13. The converted text obtaining unit 68 obtains text data resulting from translation of the text data included in the text-including image data by the text conversion unit 73 (hereinafter referred to also as "converted text data"). The text replacement unit 69 included in the web server 2 is implemented mainly using the processor 11 and the storage unit 12. The text replacement unit 69 replaces the original text data included in the text-including image data by the converted text data. The converted text obtaining unit 68 and the text replacement unit 69 differ from the converted text obtaining unit 43 and the text replacement unit 44, respectively, in the first embodiment mainly in that the former executes the processing in the web server 2 and the processing is implemented according to a program in the web server 2, with other than these not different and thus not described.

The replaced image data transmission unit 70 included in the web server 2 is implemented mainly using the processor 11, the storage unit 12, and the communication unit 13. The replaced image data transmission unit 70 sends the text-including image data with the replaced text data to the user terminal 1. Then, the display image data obtaining unit 63 obtains the text-including image data with the replaced text data.

The image display control unit 64 included in the user terminal 1 is implemented mainly using the processor 11 and the storage unit 12. The image display control unit 64 causes a display means to display an image indicated by the text-including image data, based on the text-including image data obtained by the display image data obtaining unit 63. Note that, in this display processing, the point that the character string indicated by the text data included in the text-including image data is superimposed onto the background image indicated by the background image data is similar to the first embodiment. The image display control unit 64 is implemented by a browser.

FIG. 15 shows one example of a processing flow of the user terminal 1 according to the second embodiment. In the following, processing by the user terminal 1 will be described. Initially, the document data obtaining unit 61 obtains either the original document data or the translated document data (step S201). In a case where the document data is subjected to translation (Y at step S202), the image specification information replacement unit 62 obtains the original language and the target translated language of the translated document data (step S203). Then, the image specification information replacement unit 62 rewrites the image specification information included in the image tug into information for requesting the image data conversion process to convert the text-including image data (step S204). For example, in a case where the original image specification information is "http:/img.x.jp/test.svg" and the URL of the image data conversion process in the web server 2 is "http://web.x.jp/trans", the image specification information is rewritten into image specification information that includes the original image specification information and the original and target translated languages as URL parameters, namely, http://web.x.jp/trans?url=img.x.jp/test.svg&sl=ja&tl=en.

Then, the display image data obtaining unit 63 sends an image data request to the server indicated by the image specification information, based on that image specification information (step S205), and obtains text-including image data (step S206). Then, the image display control unit 64 renders an image indicated by the text-including image data and controls so as to output the resultant image via a display means (step S207).

FIG. 16 shows one example of a processing flow of the web server 2 according to the second embodiment. In the following, image data conversion processing will be described.

Initially, the image data obtaining unit 67 obtains a replaced image data request addressed to the image data conversion process_(step S251). Thereafter, the image data obtaining unit 67 obtains text-including image data from the image server 3, based on the information that specifies the original text-including image data, included in the request (step S252). Then, the converted text obtaining unit 68 obtains the original language and the target translated language (step S253), and extracts text data from the text-including image data (step S254).

Then, the converted text obtaining unit 68 requests the text conversion unit 73 to translate the text data (step S255), and obtains translated text data from the text conversion unit 73 (step S256). Then, the text replacement unit 69 replaces the text data in the text-including image data by the translated text data (step S257). Finally, the replaced image data transmission unit 70 sends text-including image data with the replaced text data to the user terminal 1 (step S258).

As described above, even though processing of replacing the text data included in the text-including image data by converted text data is executed in a server, the translation system according to the second embodiment has a characteristic that superimposition of a text onto a background image is executed in the user terminal 1 and the original document data includes image specification information that specifies text-including image data, and can produce equivalent effect to that in the first embodiment.

Third Embodiment

A third embodiment is different from the first and second embodiments mainly in that an operation of extracting and replacing text data included in the text-including image data is executed by the image server 3. In the following, difference of the third embodiment from the second embodiment will be mainly described. A hardware structure is not different and thus not described.

Being different from the second embodiment, in a translation system according to the third embodiment, the image data obtaining unit 67, the converted text obtaining unit 68, and the text replacement unit 69 are provided in the image server 3, and the replaced image data transmission unit 70 is not provided. In the following, a difference in operation attributed to the above mentioned difference will be mainly described with reference to a sequence diagram or the like.

FIG. 17 is a sequence diagram showing one example of an outline of processing in a translation system according to the third embodiment. Although the processing until obtaining of translated document data is similar to that in the second embodiment, the processing by the image specification information replacement unit 62 (image specification information rewriting processing in FIG. 17) is different from that in the second embodiment. Specifically, in a case where the document data is subjected to conversion by the text conversion unit 73, the image specification information replacement unit 62 rewrites the image specification information included in an image tug in the document data into information for requesting the image server 3 to execute the processing described below. Specifically, the processing includes obtaining, by the image data obtaining unit 67, text-including image data from the image data storage unit 71, obtaining, by the converted text obtaining unit 68, converted text data resulting from conversion of the text data included in the text-including image data, replacing, by the text replacement unit 69, the text data included in the text-including image data by the converted text data, and sending, by the replaced image data transmission unit 70, text-including image data with the text data replaced so as to include the converted text data.

More specifically, the image specification information replacement unit 62 obtains the original language and the target translated language, and rewrites the image specification information included in the image tug into information for requesting the image data conversion process to convert the text-including image data. For example, in a case where the original image specification information is "http:/img.x.jp/test.svg", the image specification information is rewritten into image specification information which includes the original and target translated languages as URL parameters, namely, "http://img.x.jp/test.svg?sl=ja&tl=en". Then, the display image data obtaining unit 63 sends an image data request written based on the image specification information, to the image server 3, and obtains text-including image data from the image server 3. Then, the image display control unit 64 renders an image indicated by the text-including image data (image rendering processing in FIG. 17). Subsequent processing is different from that in the second embodiment mainly in that the processing is executed in the image server 3. Details on the processing will be descried referring to a processing flow.

FIG. 18 shows one example of a processing flow of the image server 3 according to the third embodiment. Initially, the image data obtaining unit 67 obtains the rewritten image data request (step S351), and obtains original text-including image data from the image data storage unit 71, based on the request (step S352 and obtain image data in FIG. 17). Then, whether or not translation of the text data in the text-including image data is requested is determined, based on whether or not a parameter is included in the rewritten image data request (step S353). In a case where translation is requested (Y at step S353), the converted text obtaining unit 68 obtains the original language and the target translated language (step S354), and extracts text data from the text-including image data (step S355 and text data extraction processing in FIG. 17). Then, the converted text obtaining unit 68 requests the text conversion unit 73 to translate the text data (step S356), and obtains translated text data from the text conversion unit 73 (step S357). Then, the text replacement unit 69 replaces the text data included in the text-including image data by the translated text data (step S358 and text data replacement processing in FIG. 17).

After execution of step S358 or in a case where translation is not requested (N at step S353), the image data transmission unit 72 sends the text-including image data to the user terminal 1 (step S359).

The image display control unit 64 included in the user terminal 1 causes a display means to display an image indicated by the text-including image data, based on the text-including image data received by the display image data obtaining unit 63 from the image data transmission unit 72 (image rendering processing in FIG. 17). In this display processing, the point that processing for superimposing the character string indicated by the text data included in the text-including image data onto the background image indicated by the background image data is executed is similar to the first and second embodiments.

As described above, even though processing of replacing the text data included in the text-including image data by the converted text data is executed in the image server 3, it is possible to obtain an effect equivalent to that in the second embodiment.

The invention claimed is:

1. An information processing system, comprising
at least one processor;
and at least one memory device that stores a plurality of instructions, which when executed by the at least one processor, causes the at least one processor to operate to:
obtain document data which indicates a document;
obtain text-including image data comprising text data and image data for displaying a text-including image in which a text indicated by the text data is superimposed on an image indicated by the image data, the text-including image data indicating an image arranged in the document;
determine whether or not the document data is translated based on a referrer of the document data;
obtain, when the determination indicates that the document data is translated, an original language and a target translated language;
cause a conversion system to convert the text data comprised in the text-including image data based on the original language and the target translated language;
obtain converted text data resulting from conversion of the text data;
replace the text data comprised in the image data by the converted text data; and
cause a client to display a text-including image in which a text indicated by the replaced text data is superimposed on the image indicated by the image data, based on text-including image data including the replaced text data and the image data.

2. The information processing system according to claim 1, wherein, in the conversion causing, the text data included in the text-including image data is obtained and the conversion system is caused to convert the text data so as to obtain the converted text data.

3. The information processing system according to claim 2, wherein, in the display causing, the client is caused to display an image in which the text indicated by the text data is not superimposed before the converted text data is obtained, and then to display a text-including image in which the text indicated by the converted text data is superimposed on the image indicated by the image data after the converted text data is obtained.

4. The information processing system according to claim 2,
wherein the document data comprises image specification information that specifies the text-including image data,
wherein, in
the obtaining of the text-including image data, the text-including image data is obtained based on the image specification information.

5. The information processing system according to claim 4, wherein in the obtaining of the document data, the conversion system is caused to convert the document data so as to thereby obtain the converted document data.

6. The information processing system according to claim 2,
wherein the document data includes image specification information that specifies the text-including image data;
wherein when executed by the at least one processor, the plurality of instructions cause the at least one processor to operate to:
send text-including image data including the converted text data; and
replace the image specification information by information for causing the conversion system to convert the text data and for sending text-including image data including the converted text data in a case where the document data is converted by the conversion system.

7. An information processing method, comprising:
obtaining document data which indicates a document;
obtaining text-including image data comprising text data and image data for displaying a text-including image in which a text indicated by the text data is superimposed on an image indicated by the image data, the text-including image data indicating an image arranged in the document;
determining whether or not the document data is translated based on a referrer of the document data;
obtaining, when the determination indicates that the document data is translated, an original language and a target translated language;
causing a conversion system to convert the text data comprised in the text-including image data based on the original language and the target translated language;
obtaining converted text data resulting from conversion of the text data;
replacing the text data included in the image data by the converted text data; and
causing a client to display a text-including image in which a text indicated by the replaced text data is superimposed on the image indicated by the image data, based on text-including image data including the replaced text data and the image data.

8. A non-transitory computer readable information storage medium storing a program for causing a computer to:
obtain document data which indicates a document;
obtain text-including image data comprising text data and image data for displaying a text-including image in which a text indicated by the text data is superimposed on an image indicated by the image data, the text-including image data indicating an image arranged in the document;
determine whether or not the document data is translated based on a referrer of the document data;
obtain, when the determination indicates that the document data is translated, an original language and a target translated language;
cause a conversion system to convert the text data comprised in the text-including image data based on the original language and the target translated language;
obtain converted text data resulting from conversion of the text data;
replace the text data comprised in the image data by the converted text data; and
cause a client to display a text-including image in which a text indicated by the replaced text data is superimposed on the image indicated by the image data, based on text-including image data comprising the replaced text data and the image data.

9. The information processing system according to claim 1,
wherein, being triggered by the replacement of the text data comprised in the text-including image data to the replaced text data, a client is caused to display a new text-including image in which a text indicated by the replaced text data is superimposed on the image indicated by the image data.

* * * * *